US006918466B1

(12) United States Patent
Decker, Jr. et al.

(10) Patent No.: US 6,918,466 B1
(45) Date of Patent: Jul. 19, 2005

(54) LOCKABLE BRAKE PEDAL FASTENER

(75) Inventors: Daniel L. Decker, Jr., Castle Rock, CO (US); Jeffrey T. Samson, Boulder, CO (US); Nathan R. Mortensen, Berthoud, CO (US); Leland C. Leber, Fort Collins, CO (US)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

(21) Appl. No.: 10/650,347

(22) Filed: Aug. 27, 2003

Related U.S. Application Data

(63) Continuation-in-part of application No. 10/015,339, filed on Dec. 12, 2001, now Pat. No. 6,634,466.

(51) Int. Cl.[7] .................................................. G05G 1/14
(52) U.S. Cl. ............................ 188/3 R; 74/512; 74/560
(58) Field of Search ................................. 188/3 H, 3 R, 188/112 A, 112 R; 303/7, 123, 124

(56) References Cited

U.S. PATENT DOCUMENTS

| | | |
|---|---|---|
| 1,907,835 A | 5/1933 | Langbein |
| 2,566,859 A | 9/1951 | Seeler |
| 2,676,225 A | 4/1954 | Jubell |
| 2,711,228 A | 6/1955 | Shank |
| 2,964,965 A | 12/1960 | Hanson |
| 3,662,593 A | 5/1972 | Pirrello et al. ................. 73/132 |
| 3,866,719 A | 2/1975 | Streutker ..................... 188/3 R |
| 3,877,318 A | 4/1975 | Castoe ......................... 74/481 |
| 3,991,609 A | 11/1976 | Asmus et al. ................. 73/132 |
| 4,186,595 A | 2/1980 | Domitter ...................... 73/132 |
| D308,525 S | 6/1990 | Robbins ........................ D15/4 |
| 5,012,689 A | 5/1991 | Smith ......................... 74/89.17 |
| 5,031,729 A | 7/1991 | Wittkop et al. ............. 188/3 H |
| 5,078,024 A | 1/1992 | Cicotte et al. ................. 74/512 |
| 5,299,668 A | 4/1994 | Youngers et al. ........... 188/352 |
| 5,368,135 A | 11/1994 | Sallee ......................... 188/312 |
| 5,411,321 A | 5/1995 | Harness ......................... 303/7 |
| 5,460,061 A | 10/1995 | Redding et al. ............... 74/512 |
| D370,448 S | 6/1996 | McCoy et al. ............. D12/180 |
| 5,911,483 A | 6/1999 | Overhulser ..................... 303/7 |
| 5,915,797 A | 6/1999 | Springer ........................ 303/7 |
| 5,915,798 A | 6/1999 | Ford ............................. 303/7 |
| D418,098 S | 12/1999 | Wallace ..................... D12/180 |
| 6,095,619 A | 8/2000 | Granata ......................... 303/7 |
| 6,126,246 A | 10/2000 | Decker, Sr. et al. ............ 303/7 |
| 6,131,712 A | 10/2000 | Rhodenizer ................. 188/352 |
| D468,243 S | 1/2003 | Iida ............................ D12/180 |
| 6,634,466 B1 | 10/2003 | Brock et al. ................. 188/3 R |
| 6,652,042 B2 | 11/2003 | Johnson ....................... 303/123 |

OTHER PUBLICATIONS

Print out of pages related to the BrakePro Braking System found on the Roadmaster website, www.roadmaster–tow–bars.com/Brakepro.htm. printed on May 19, 2004 (product believed to be added to the website after Jun. 23, 2003), 4 pages.

Digital photographs of a Roadmaster BrakePro braking system unit with fastening device, purchased on Jan. 29, 2004, 4 pages.

2004 BrakePro Owner's Manual, Roadmaster, Inc., 12 pages.

Installation Instructions for the Second Vehicle Kit # 98100 for Brake Master 9000 & 9100, copyright 1999, from http://www.roadmasterinc.com/pdf/85–1850.pdf, printed Jun. 25, 2004, 11 pages.

Master Concepts Inc. Brakebuddy® brochure dated Aug. 2001, 6 pages.

Master Concepts, Inc. Brakebuddy® brochure dated Jan. 2002, 6 pages.

Photos taken of Blue Ox Apollo Braking System with brake fastener, purchased approximately Mar. 2003, 12 pages.

*Primary Examiner*—Christopher P. Schwartz
(74) *Attorney, Agent, or Firm*—Sheridan Ross P.C.

(57) ABSTRACT

An improved brake pedal fastener adapted for use with a tandem-type braking system is disclosed. In one embodiment, the brake pedal fastener can be selectively locked against and removed from varying sized brake pedals in a quick and easy manner.

31 Claims, 10 Drawing Sheets

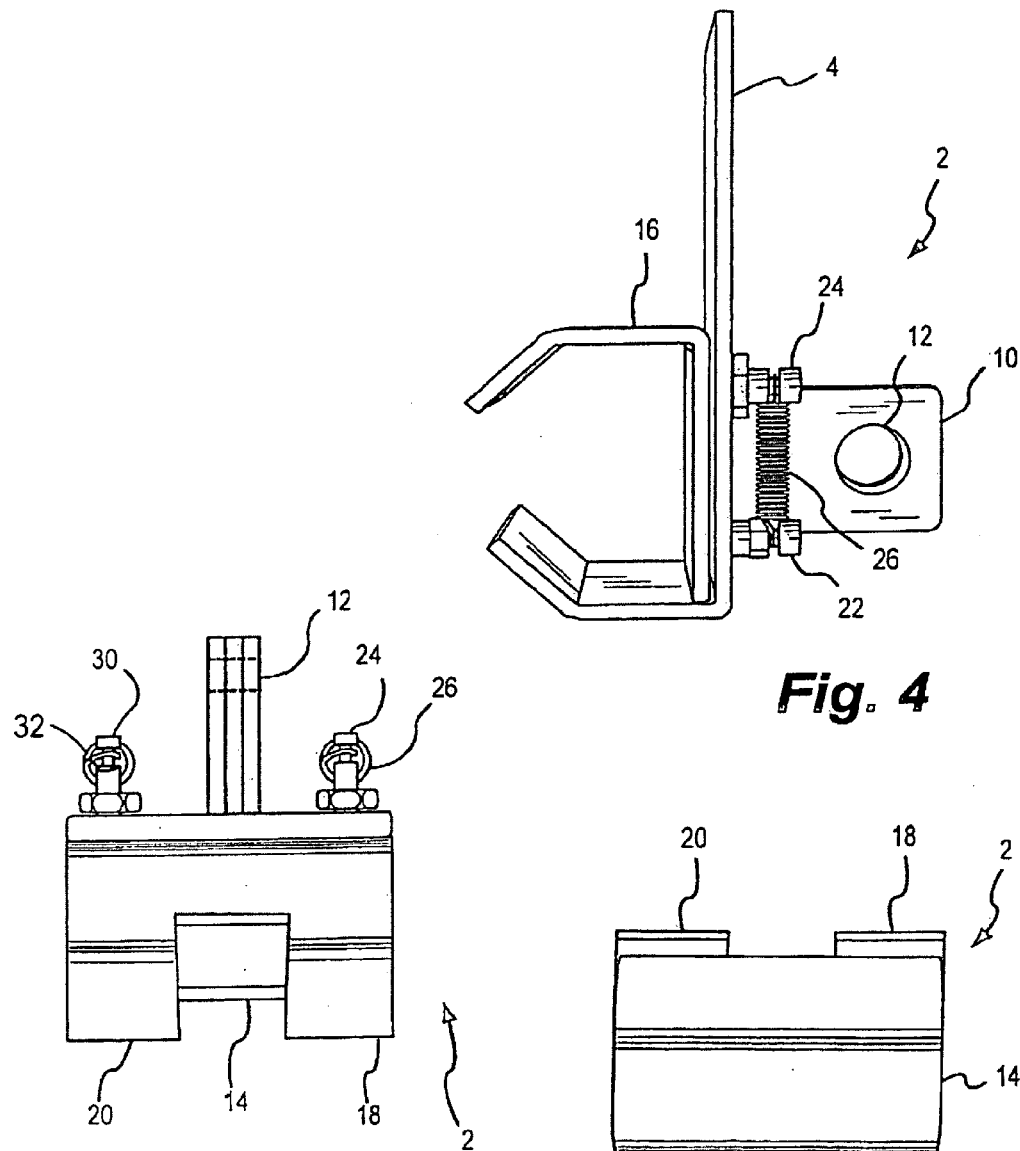

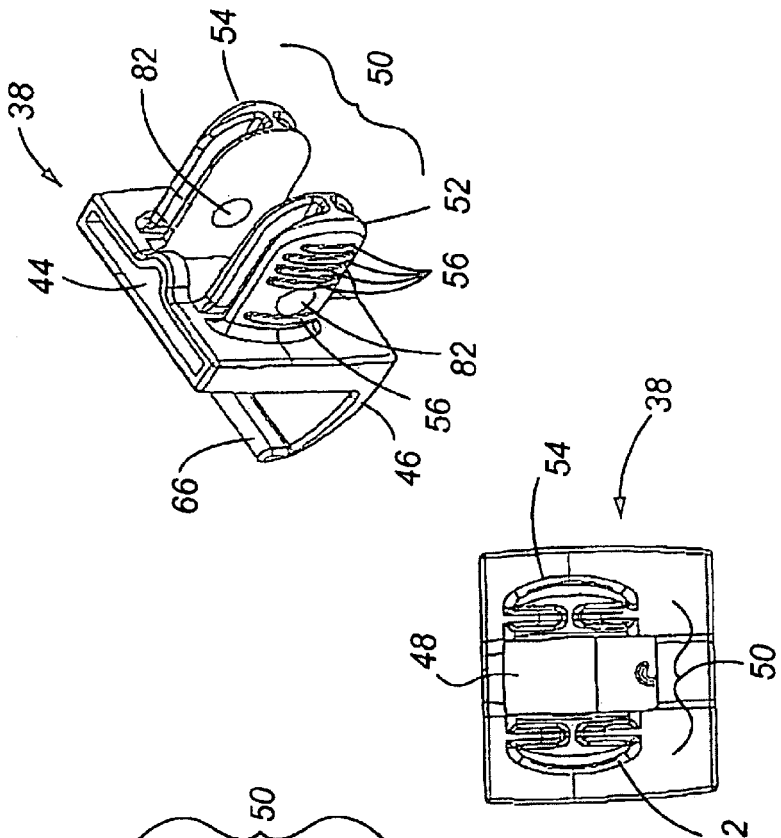
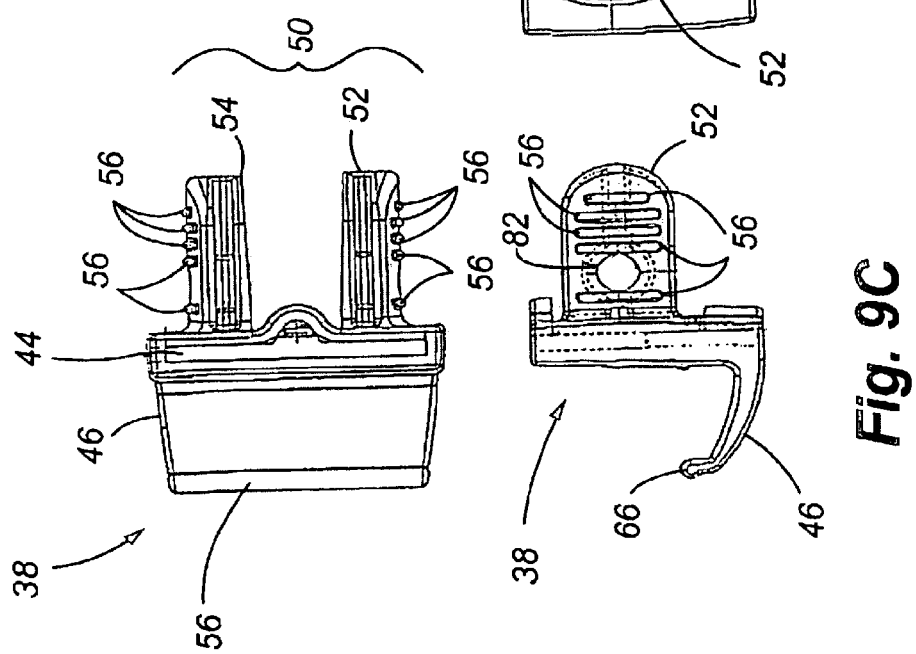

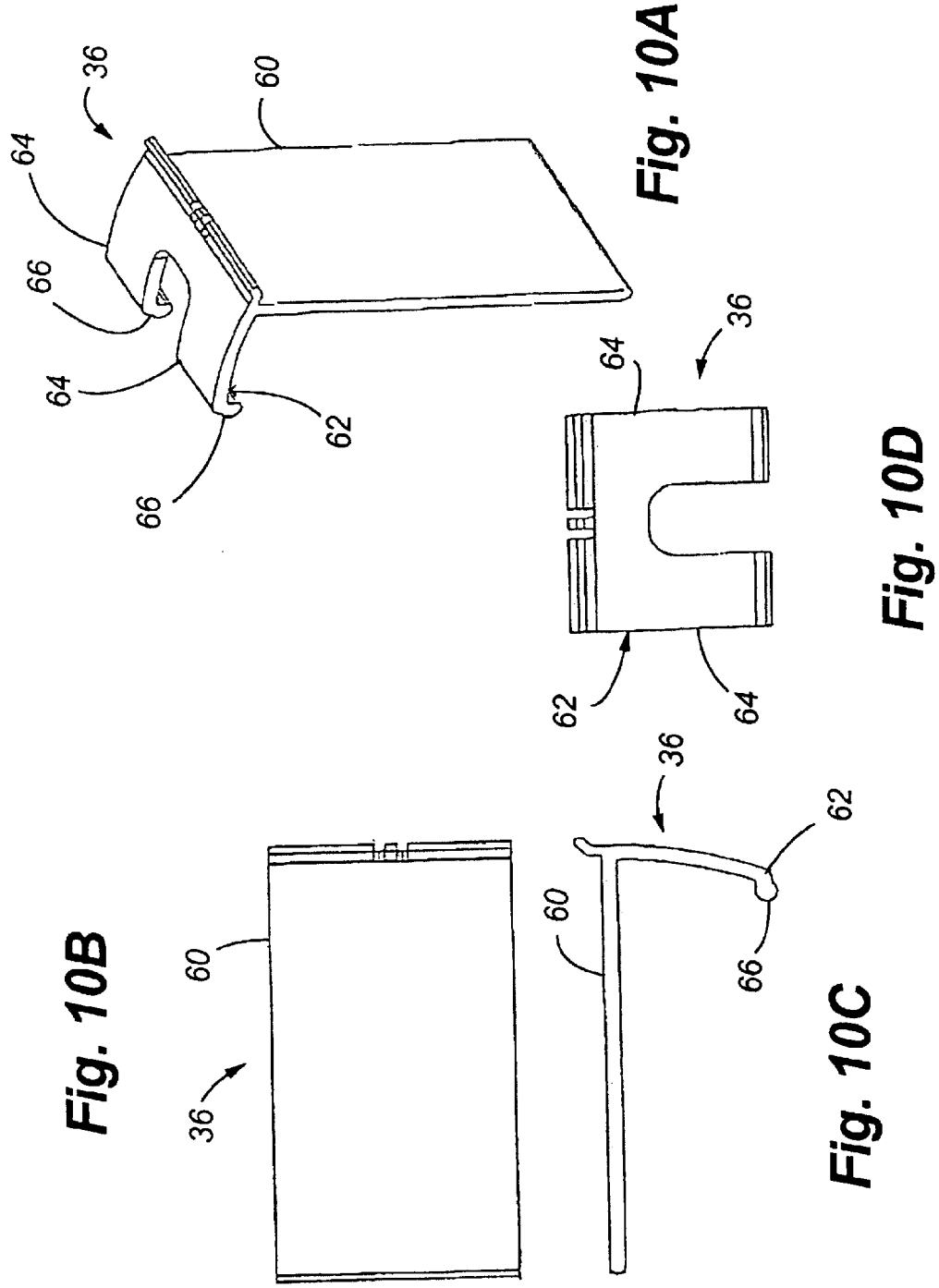

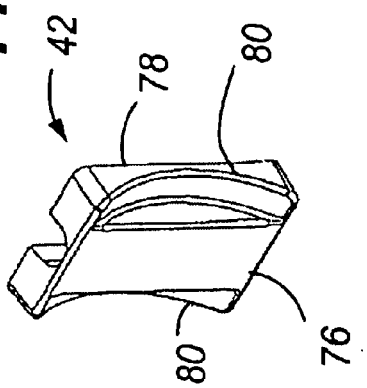
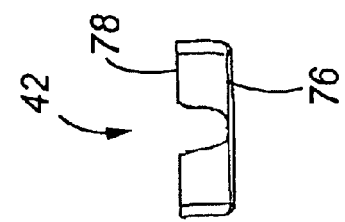
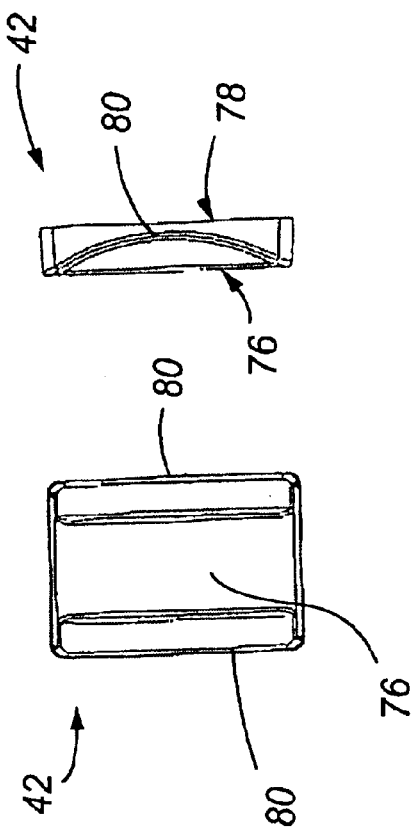

LOCKABLE BRAKE PEDAL FASTENER

CROSS-REFERENCE TO RELATED APPLICATIONS

This is a continuation-in-part patent application which claims priority from U.S. Utility Patent Application, Ser. No. 10/015,339, entitled "BRAKE PEDAL FASTENER," filed on Dec. 12, 2001, now issued as U.S. Pat. No. 6,634,466, and which is herein incorporated by reference in its entirety.

FIELD OF THE INVENTION

The present invention relates to the field of tandem vehicle braking systems and, more particularly, to an improved brake pedal fastener adapted for use with a towed vehicle braking system.

BACKGROUND OF THE INVENTION

When traveling by motor home, it is often desirable to tow a secondary vehicle behind the motor home. During such trips, it becomes necessary to brake the towed vehicle so as to avoid undue wear on the brakes of the motor home. Various methods of braking the towed vehicle in tandem with the motor home are well known in the art. A typical braking system is comprised of a pedal depressing apparatus that communicates with the towed vehicle's onboard braking system. Such apparatus are generally further comprised of a telescoping shaft or rod that is mechanically or hydraulically actuated, or is spring-biased. The shaft is typically mounted between the towed vehicle brake pedal and the steering wheel or the seat of that towed vehicle. When the shaft is actuated, the towed vehicle brake pedal is depressed and the towed vehicle is slowed in relation to the towing vehicle (such as a motor home, truck or car).

Regardless of how it is actuated, the shaft of the pedal depressing apparatus must be interconnected to the brake pedal of the towed vehicle. Various mechanisms are known in the art to accomplish this task. Known devices exist, which securely grip a brake pedal, but these devices are not easily and quickly installed or removed. For example, U.S. Pat. No. 5,411,321 to Harness discloses, among other things, a pedal-engaging clamp that is comprised of top and bottom clamp portions secured onto the brake pedal by bolts and wing nuts. The antiquated bolt and wing nut configuration of the Harness device precludes easy installation and removal. Similarly, U.S. Pat. No. 3,866,719 to Streutker discloses, among other things, a pedal clamp with a rigid plate having a pair of fingers that are spaced from the main body of the plate and a moveable plate that is rotatably tightened against the front of the brake pedal. Like the Harness device, the Streutker pedal clamp cannot be quickly installed or removed because the moveable plate must be screwed or unscrewed. Thus, there is a need for a brake pedal fastener that can be quickly and easily installed and removed.

Other brake fasteners are known, which can be more quickly installed than the Harness and Streutker devices. However, these fasteners are not easily separated from the brake system for maintenance purposes, nor are they universally adaptable for use with piston-type tandem brake systems. It would be advantageous to have an easily installable/removable brake pedal fastener that could be used with multiple tandem braking systems. Moreover, it is important for the pedal fastener to be modular so that it could be replaced or serviced.

Another problem exists with known brake pedal fasteners. Of those fasteners that may be quickly installed and removed, there are no known devices that grip the brake pedal by four or more surfaces and are easily and quickly adaptable for use with multiple sizes of brake pedals. For example, U.S. Pat. No. 5,915,797 to Springer discloses, among other things, a C-channel type brake pedal engaging member, which is retained by flanges around the sides of the pedal. Although Springer's engaging member appears to be capable of gripping a brake pedal by four surfaces, it cannot be adjusted to accept multiple sizes of brake pedals. Other known devices, like that disclosed by Streutker, grip the brake pedal at three or less surfaces of contact (e.g., the front, top and back of the pedal). Since the towed vehicle is typically unoccupied, it would be advantageous to ensure that the brake pedal fastening device grip as many surfaces as possible in order to ensure that the device does not become dislodged in transit. Thus, there is a need for a more secure brake pedal fastener that can be easily adapted to grip four or more surfaces of various sized brake pedals.

When traveling over uneven terrain, it becomes especially important to ensure that the brake pedal fastening device does not become dislodged. Known devices that can be locked against the brake pedal are not readily installed or released from a variety of sized brake pedals. Thus, there is a need for a brake pedal fastener that can be locked against and/or around multiple sizes of brake pedals and easily removed/installed.

To obtain a complete understanding of the aforementioned patents, reference should be made directly thereto.

SUMMARY OF THE INVENTION

The present invention is designed to overcome the aforementioned problems and meet the aforementioned, and other, needs. It is thus one aspect of the present invention to provide an expandable and selectively lockable, brake pedal fastener that can be adapted for use with varying sizes of brake pedals. Another aspect of this invention is to provide a brake fastener that can be easily adapted for use with a piston-type tandem braking system.

In one embodiment of the present invention, an improved brake pedal fastener adapted for use with a tandem braking system, is provided, comprising:
 (a) an upper member;
 (b) a lower member in slidable communication with the upper member;
 (c) a locking mechanism in communication with the upper member and having a selectable first position and a second position;
 (d) a coupling member connected to the lower member; and
  wherein the second position, the locking mechanism applies sufficient frictional force to lock the upper member in a selected position against the brake pedal.

The present invention offers an alternative to traditional brake pedal engaging devices by offering an inexpensive, secure device. Now, an operator can more quickly and easily attach, lock and remove a secure tandem braking system on a variety of brake pedals.

BRIEF DESCRIPTION OF DRAWINGS

FIG. 4 is a right side perspective view of one embodiment of the brake pedal fastener;

FIG. 5 is a top plan view of one embodiment of the brake pedal fastener;

FIG. 6 is a bottom plan view of one embodiment of the brake pedal fastener;

FIG. 9A is a rear perspective view of one embodiment of a lower member of the brake pedal fastener;

FIG. 9B is a top plan view of one embodiment of the lower member shown in FIG. 9A;

FIG. 9C is a left elevation view of the lower member shown in FIG. 9A;

FIG. 9D is a rear elevation view of the lower member shown in FIG. 9A;

FIG. 10A is a rear perspective view of one embodiment of an upper member of the brake pedal fastener;

FIG. 10B is a rotated, rear elevation view of the upper member shown in FIG. 10A;

FIG. 10C is a rotated, right elevation view of the upper member shown in FIG. 10A;

FIG. 10D is a rotated, top plan view of the upper member shown in FIG. 10A;

FIG. 12A is a front perspective view of one embodiment of the cam shoe of the brake pedal fastener;

FIG. 12B is a top plan view of the cam shoe shown in FIG. 12A;

FIG. 12C is a front elevation view of the cam shoe shown in FIG. 12A;

FIG. 12D is a left elevation view of the cam lever shown in FIG. 12A;

Figure 1B:
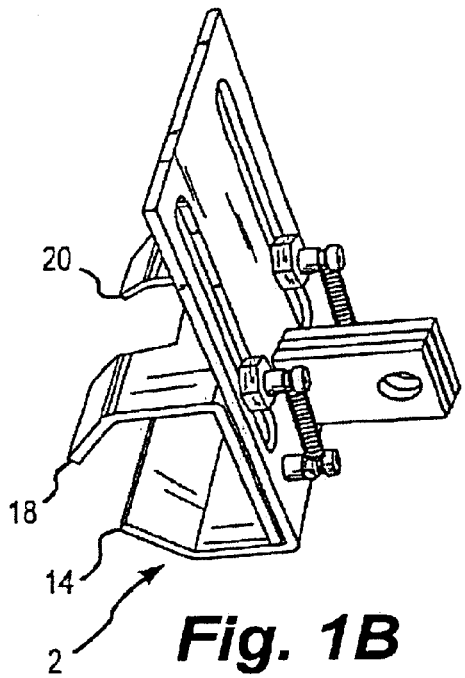
FIG. 1B is a side perspective view of one embodiment of the brake pedal fastener in a closed position.

The following components and numbers associated thereto are shown in the drawings and provided here for ease of reference:

| # | Component |
|---|---|
| 2 | Brake pedal fastener |
| 4 | Stationary plate |
| 6 | First slot |
| 8 | Second slot |
| 10 | Coupling |
| 12 | Coupling aperture |
| 14 | Flange of stationary plate |
| 16 | Movable plate |
| 18 | First flange |
| 20 | Second flange |
| 22 | First pin of stationary plate |
| 24 | First pin of movable plate |
| 26 | First spring |
| 28 | Second pin of stationary plate |
| 30 | Second pin of movable plate |
| 32 | Second spring |
| 34 | Piston-type tandem braking system |
| 36 | Upper jaw |
| 38 | Lower jaw |
| 39 | Locking mechanism |
| 40 | Cam lever |
| 42 | Cam shoe |
| 44 | Cavity |
| 46 | Flange of lower jaw |
| 48 | Aperture |
| 50 | Handle |
| 52 | First protruded member |
| 54 | Second protruded member |
| 56 | Ridge |
| 58 | Coupling member |
| 60 | Vertical plate |
| 62 | Flange of upper jaw |
| 64 | Finger-like protrusion |
| 66 | Beaded edge |
| 68 | Blasing means |
| 70 | Tab |
| 72 | Cam |
| 74 | Axial aperture |
| 76 | Front surface of cam shoe |
| 78 | Rear surface of cam shoe |
| 80 | Concave recess |
| 82 | Alignment aperture |
| 84 | Pin |

DETAILED DESCRIPTION OF THE PREFERRED EMBODIMENT

While this invention is susceptible of embodiments in many different forms, there are, as shown in the drawings and will herein be described in detail, preferred embodiments of the invention. The reader is to understand that the present disclosure is to be considered as an exemplification of the principles of the invention and is not intended to limit the broad aspects of the invention to the embodiments illustrated.

The present invention recognizes the limited nature of traditional brake fastening devices for tandem braking systems and offers a solution to the difficulty of quickly and securely installing these devices on various sized brake pedals. Thus, the present invention presents an improvement to traditional brake pedal fasteners.

Figure 1C:
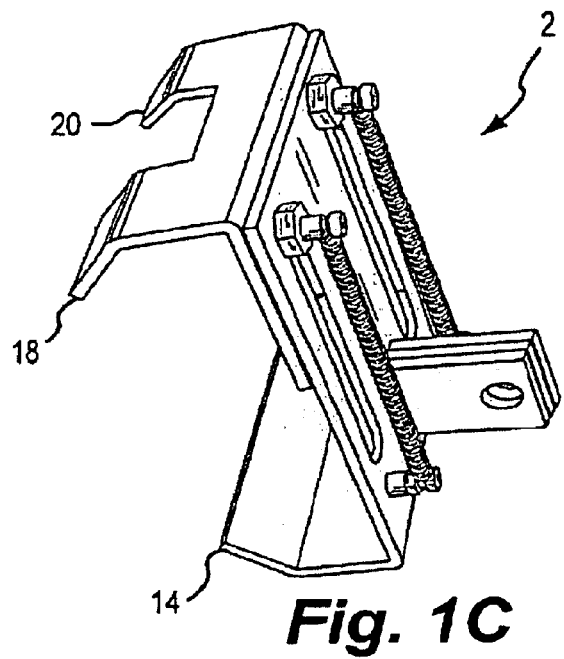
FIG. 1C is a side perspective view of one embodiment of the brake pedal fastener in an open position.
Figure 1A:
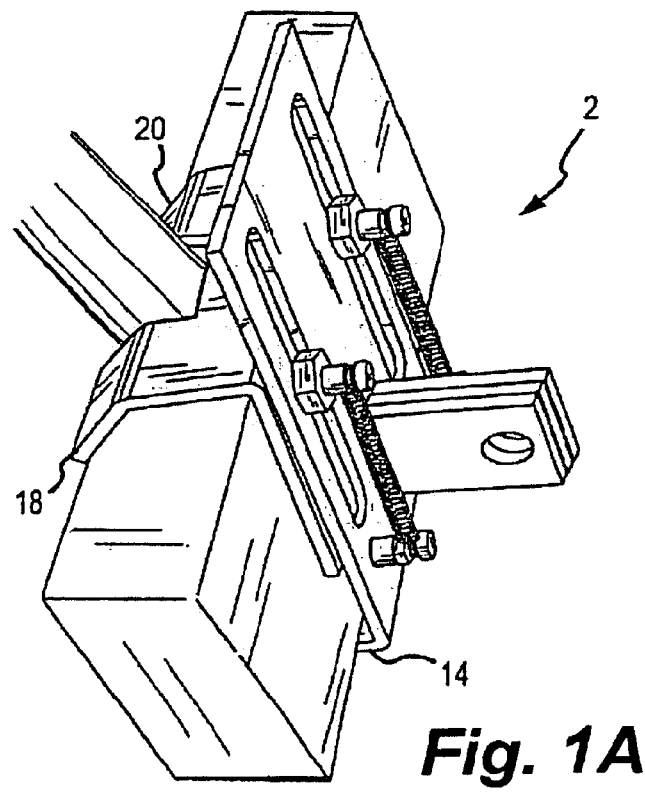
FIG. 1A is a side perspective view of one embodiment of the brake pedal fastener in use with a brake pedal.

Referring now to the drawings, FIG. 1 depicts a side perspective view of one embodiment of the present invention in use with a brake pedal. Substantially rectangular brake pedals of various sizes can be used with the brake pedal fastener 2. FIG. 1A depicts a side perspective view of one embodiment of the present invention in a closed position. In one embodiment, the brake pedal fastener 2 is manually expanded to an open position (See FIG. 1B) and then slipped over the desired brake pedal. In one embodiment, the flanges (14, 18, 20) of the brake pedal fastener 2 straddle the brake pedal stem and grip top, bottom, front, and rear surfaces of the brake pedal.

Figure 2:
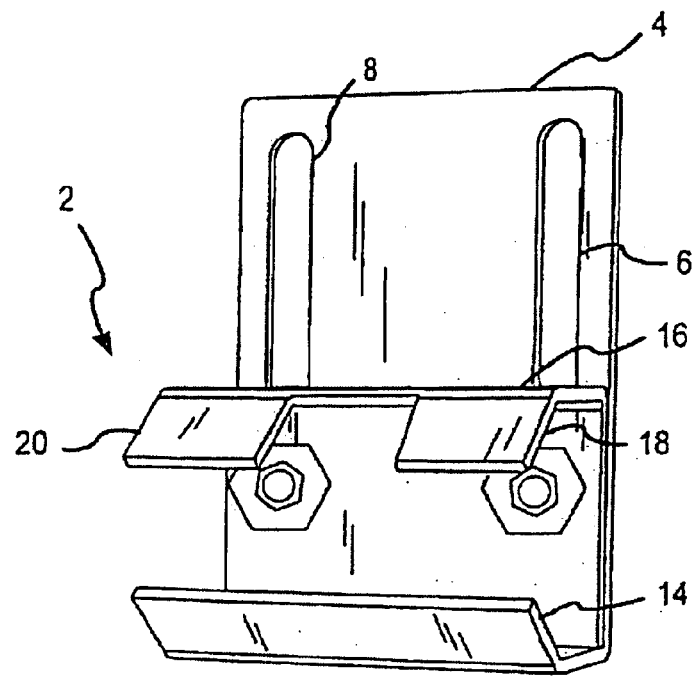
FIG. 2 is a front perspective view of one embodiment of the brake pedal fastener.
Figure 3:
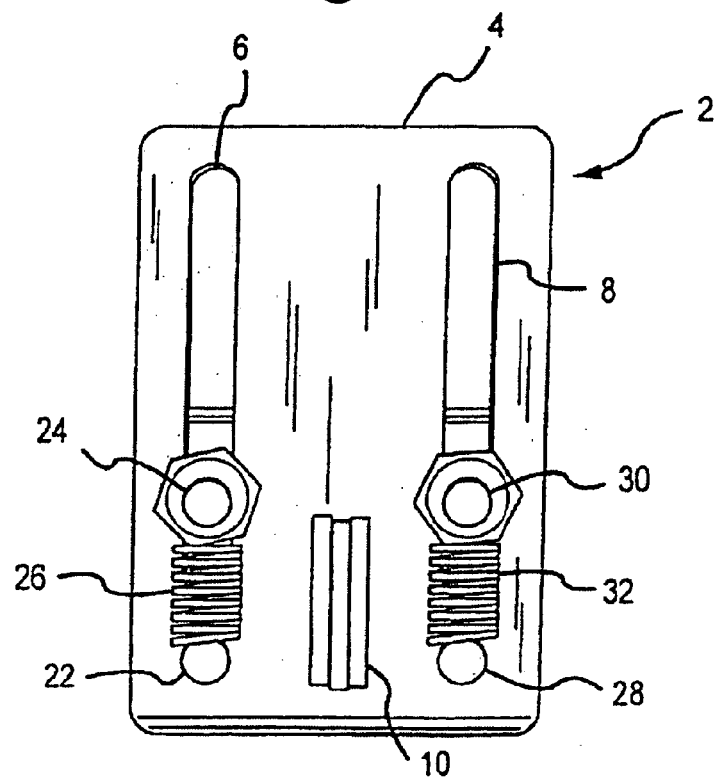
FIG. 3 is a rear elevation view of one embodiment of the brake pedal fastener.

FIGS. 2 and 3 depict front prospective and rear elevation views of one embodiment of the present invention. In one embodiment, the brake pedal fastener 2 is generally comprised of a stationary plate 4 and a moveable plate 16 with flanges (18, 20) for gripping the pedal. The moveable plate 16 is slidably interconnected to the stationary plate 4 via a first slot 6 and a second slot 8 in the stationary plate 4. The moveable plate 16 is spring-biased toward a closed position. A coupling 10 adapted for use with a piston-type tandem braking system is interconnected to the rear side of the stationary plate 4.

In one embodiment, the stationary plate 4 is comprised of a vertical plate with a flange 14 which is bent upward, thus, creating a generally J-like shape. As one skilled in the art can appreciate, the flange 14 may also be perpendicular to the bottom of the stationary plate 4, thus, creating an L-shape. Regardless of the resulting shape, the flange 14 is used to grip at least the bottom surface of the brake pedal and, for added stability, the rear surface as well.

In order to provide a mechanism for slidably interconnecting the moveable plate 16 to the stationary plate 4, in one embodiment, the stationary plate 4 is further comprised of at least one slot. As shown in FIG. 3, in one embodiment, the stationary plate 4 has a vertical, first slot 6 in parallel to a second slot 8. A first pin 22 and a second pin 28 protrude from the back of the stationary plate 4 and are used in connection with a biasing means to keep the moveable plate 16 in a closed position. In one embodiment, the biasing means comprises a first spring 26 and a second spring 32.

In one embodiment, the moveable plate 16 is generally comprised of a vertically-mounted plate with at least one finger-like flange for gripping the top and rear surfaces of the brake pedal. As shown in FIGS. 2 and 3, in one embodiment, the moveable plate 16 has a first flange 18 and a second flange 20. In one embodiment, a first pin 22 and a second pin 28 are mounted in parallel on the rear of the moveable plate 16 at a distance that corresponds to the first slot 6 and second slot 8. In this embodiment, the first pin 22 and second pin 28 protrude through the rear of the stationary plate 4 via the first slot 6 and second slot 8.

In order to ensure that the moveable plate 16 is tightly secured against the top of the brake pedal, a biasing means (such as a first spring 26 or similar device) is interconnected between the first pin of the stationary plate 22 and the first pin of the moveable plate 24. See FIG. 4. Similarly, a second spring 32 may also interconnect to a second pin of the stationary plate 28 and the second pin of the moveable plate 30. See FIGS. 3, 5, and 6. Used in tandem, the first spring 26 and the second spring 32 keep the moveable plate 16 biased toward a closed position. It is also possible to have the plate secured using rubber straps or other biased mechanisms.

Figure 7:
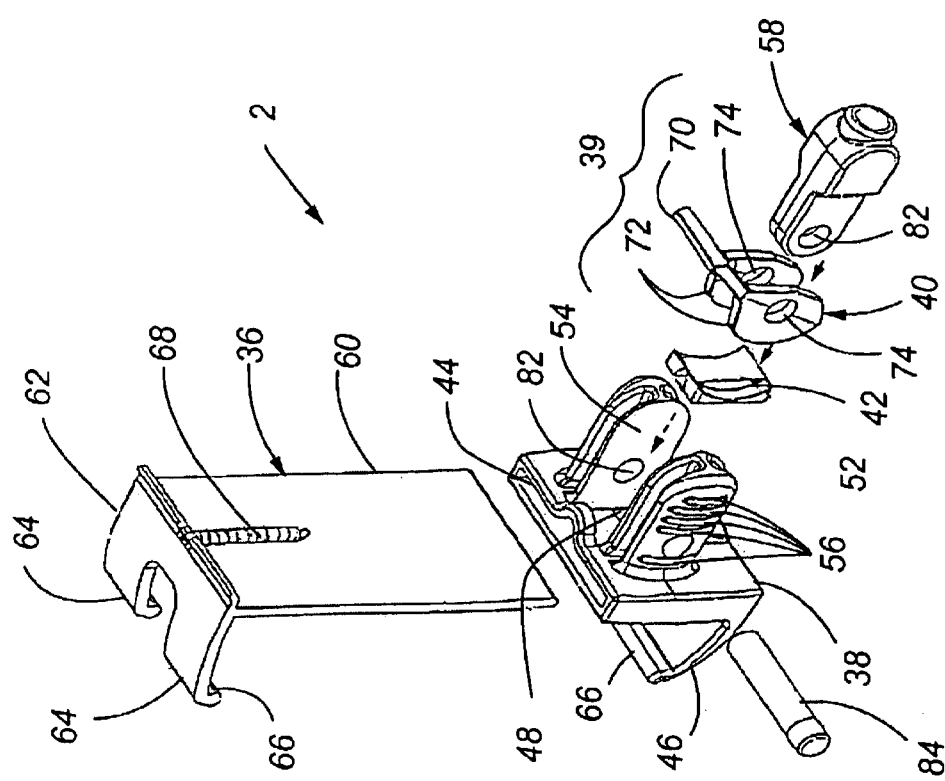
FIG. 7 is an exploded perspective view of one embodiment of the brake pedal fastener.

When traveling over uneven terrain, it becomes especially important to ensure that the brake pedal fastener 2 does not become dislodged from the brake pedal. To that end, in one embodiment, the brake pedal fastener 2 employs the use of a locking mechanism 39 to lock an upper gripping means (e.g., an upper jaw 36) in a selected position relative to a lower gripping means (e.g., a lower jaw 38). As shown in FIG. 7, in one embodiment, the locking mechanism 39 is further comprised of a cam lever 40 in communication with a cam shoe 42. Alternatively, as further discussed below, the locking mechanism 39 can be comprised of a cam lever 40 without a cam shoe 42.

Figure 8:
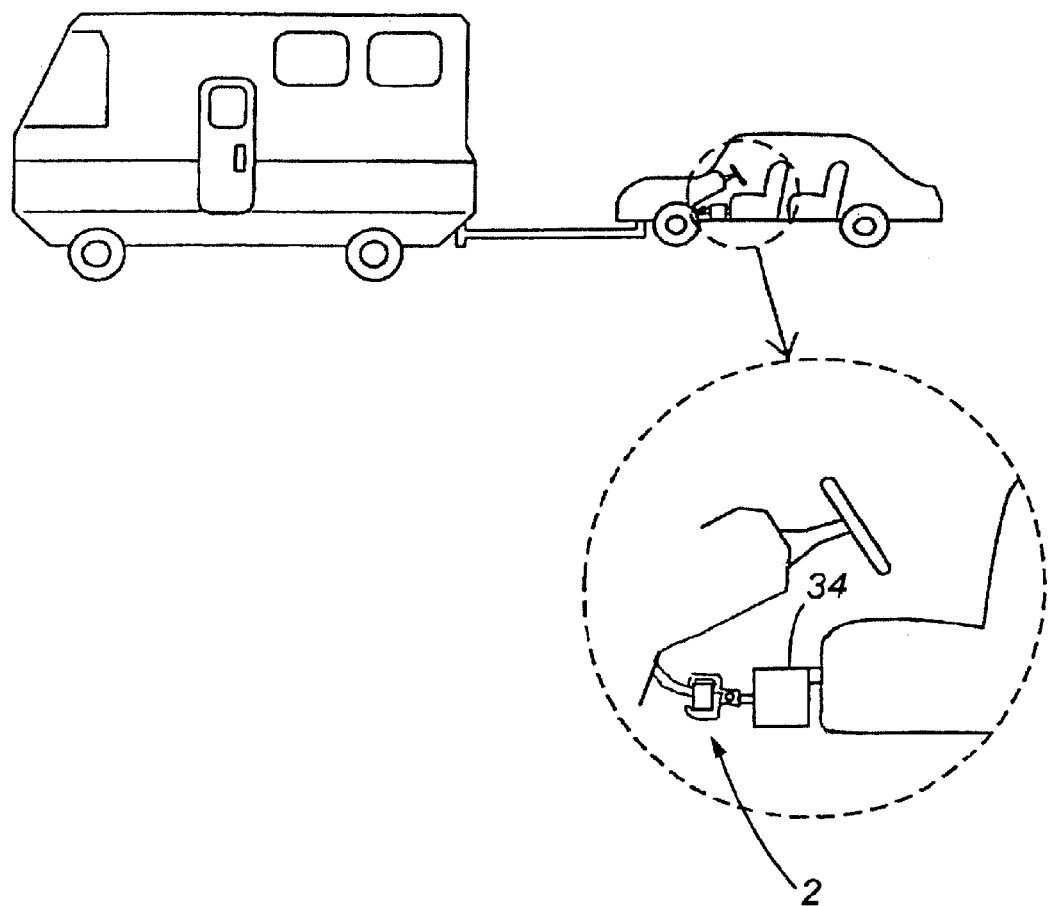
FIG. 8 is a left elevation view of one embodiment of the brake pedal fastener in use with the-piston-type tandem brake system.

After the upper jaw 36 is expanded from the lower jaw 38 and slipped around the brake pedal, in one embodiment, the cam lever 40 is then rotated against the cam shoe 42, thereby applying frictional force to and locking the upper jaw 36. As a result, the brake pedal fastener 2 firmly grasps the brake pedal. To release the brake pedal fastener 2, the operator rotates the cam lever 40 in an opposite direction, thereby relieving the frictional force asserted by the cam shoe 42 on the upper jaw 36. Thus, the brake pedal fastener 2 can be easily installed and selectively locked against and/or released from the brake pedal. See FIG. 8 for depiction of one embodiment of the brake pedal fastener 2 in use with the piston-type tandem brake system 34.

While the upper jaw 36 and lower jaw 38 can communicate in a variety manners, in one embodiment, the lower jaw 28 is generally comprised of a cavity 44 and a flange 46. See FIGS. 7 and 9A–9D. In this embodiment, the cavity 42 is of sufficient size and shape to accept the upper jaw 36. In one embodiment, the flange 46 is curved slightly upward toward the brake pedal, thereby creating a J-like shape. See FIG. 9C. Alternatively, the flange 46 could be positioned in a more perpendicular fashion.

In order to facilitate the locking of the upper jaw 36, in one embodiment, the lower jaw 38 is further comprised of an aperture 48 to accept the cam shoe 42. See FIGS. 7 and 9D. In this embodiment, the cam shoe 42 is seated against the upper jaw 36 within the aperture 46 of the lower jaw 38. Alternatively, instead of using the aperture 46, the cam shoe 42 can partially integrated into the lower jaw 38 in such a manner (e.g., via flexible tabs) that allows the cam shoe 42 to selectively move against and apply sufficient frictional force to a surface of the upper jaw 36. As one ordinarily skilled in the art can appreciate, other means of having the cam shoe 42 communicate with the cam lever 42 and upper jaw 36 are also intended to be within the spirit and scope of the present invention. Moreover, it is also envisioned the cam shoe 42 can be eliminated and the cam lever 40 directly contact the surface of the upper jaw 36 to lock the upper jaw 36 in a particular position relative to the lower jaw 38.

In order to facilitate the application and release of the brake pedal fastener 2 to the brake pedal, in one embodiment, the brake pedal fastener 2 is further comprised of a handle 50. As shown in FIGS. 7 and 9A–9D, in one embodiment, the handle 50 is generally comprised of a first protruded member 52 and a second protruded member 54. This configuration allows the operator to grip the lower jaw 38 while expanding the upper jaw 36 up and over the top surface of the brake pedal. To increase the ergonomic feel of the handle 50 and provide a greater surface area for gripping the lower jaw 38, in one embodiment, the handle 50 is further comprised of a plurality of ridges 56. See FIGS. 9A–9D. Other means of facilitating the gripping of the handle 50 e.g., use of dimples, addition of tactile material, etc.) are also intended to be within the spirit and scope of the present invention. As shown in FIG. 7 and as further described below, in one embodiment, the handle 50 also functions to partially house and align the cam shoe 42, cam lever 40, and coupling member 58.

Turning now to FIGS. 1A–10D, in one embodiment, the upper jaw 36 is further comprised of a vertical plate 60 interconnected to a flange 62. One purpose of the vertical plate 60 is to provide a surface for the locking mechanism 39 to apply frictional force, thereby securing the upper jaw 36 in place. Although preferably made of single piece construction, it is also envisioned that upper jaw 36 can be manufactured in a plurality of pieces. In order for the upper jaw 36 to freely reciprocate within the lower jaw 38, in one embodiment, the vertical plate 60 has a width and depth less than that of the aperture 48 of the lower jaw 36. As shown in FIGS. 10A and 10B, in one embodiment, the vertical plate 60 is of solid construction. Alternatively, the vertical plate 60 could made with perforations.

In order to negotiate a brake stem of the brake pedal, in one embodiment, the flange 62 of the upper jaw 36 is comprised of two finger-like protrusions 64. See FIGS. 10A and 10D. Other shapes of the flange 62 are also envisioned to be within the spirit and scope of the present invention. In one embodiment, a beaded edge 66 can be integrated into an end of the flange 62 to facilitate removal of the flange 62 from the upper surface of the brake pedal. See FIGS. 10A and 10D. A similar beaded edge 66 could be integrated into the flange 46 of the lower jaw 38 to facilitate removal of the lower jaw 38 from the brake pedal.

Similar to that described above, in one embodiment, a biasing means 68 can also be interconnected to the upper jaw 36 and lower jaw 38 in order to provide greater overall gripping power to the brake pedal fastener 2, and to keep the upper jaw 36 from becoming lost during storage, transport, and/or handling of the brake pedal fastener 2. In one embodiment, the biasing means 68 is a spring. See FIG. 7. As one ordinarily skilled in the art can appreciate, the biasing means 68 can be any biased mechanism, (e.g., a band). Of course, it is also envisioned that the current invention does not employ the use of a biasing mechamism interposed between the upper jaw 36 and lower jaw 38.

Figure 11A:
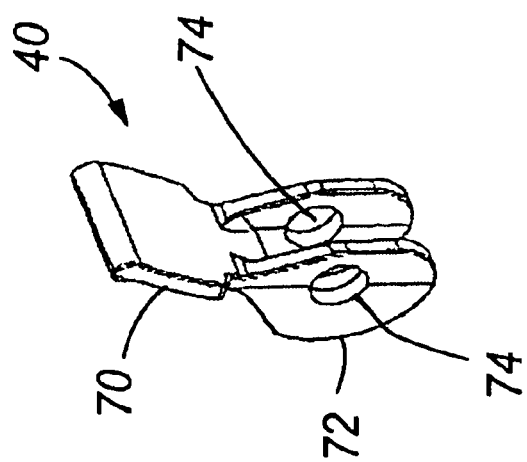
FIG. 11A is a rear perspective view of one embodiment of the cam lever of the brake pedal fastener.
Figure 11C:
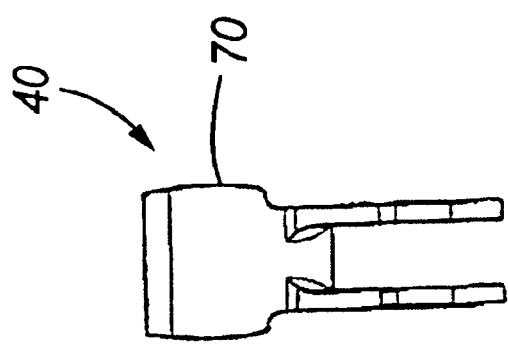
FIG. 11C is a rear elevation view of the cam lever shown in FIG. 11A.
Figure 11B:
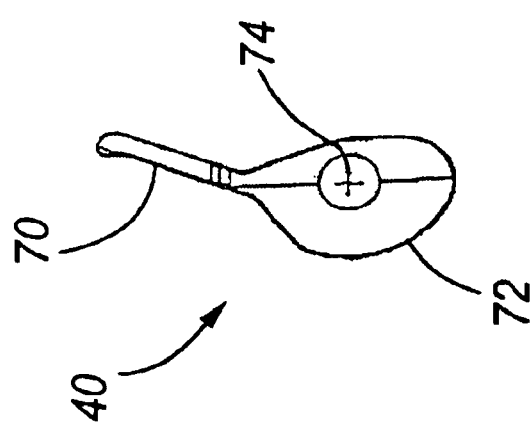
FIG. 11B is a left elevation view of the cam lever shown in FIG. 11A.
Figure 13A:
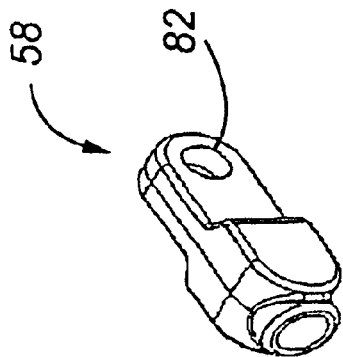
FIG. 13A is a front perspective view of one embodiment of the coupling member of the brake pedal fastener.
Figure 13D:
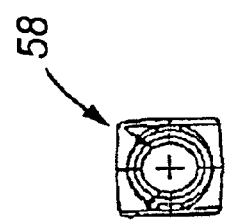
FIG. 13D is a front elevation view of the coupling member shown in FIG. 13A.
Figure 13B:
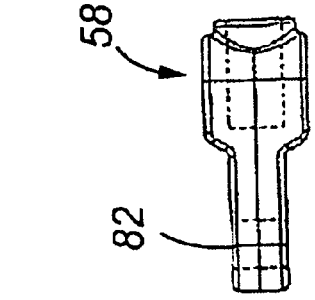
FIG. 13B is a rotated, top plan view of the coupling member shown in FIG. 13A.
Figure 13C:
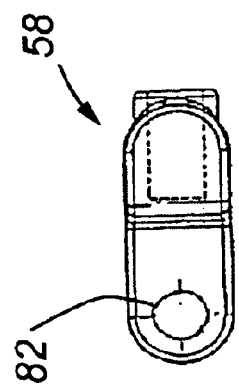
FIG. 13C is a right elevation view of the coupling member shown in FIG. 13B.

Referring now to FIGS. 11A–11C, in one embodiment, the cam lever 40 is comprised of a tab 70 and a cam 72. The tab 70 can be made in various shapes, but is preferably made of sufficient size for the operator to press and release the tab 70. Similarly, the shape of the cam 72 can be varied to acconmmodate the amount of desired frictional force to be applied to the cam shoe 42 and/or upper jaw 36. In one embodiment, the cam lever 40 is further comprised of opposable, axial apertures 74, which facilitate rotation and ensure alignment of the cam lever 40. In one embodiment, the cam lever 40 is made in a sufficient shape to partially house the coupling member 58. See FIG. 7.

As shown in FIGS. 12A–12D, in one embodiment, the cam shoe 42 is generally comprised of a front surface 76 and a rear surface 78. In one embodiment, the front surface 76 is configured with two concave recesses 80 which are adapted to receive the cam 72 of the cam lever 40. See FIGS. 12A–12C. In one embodiment, the rear surface 78 is partially planar so that the cam shoe 42 can be locked firmly against a desired portion of the upper jaw 36. In one embodiment, the cam shoe 42 is of sufficient size to fit within the aperture 48 of the lower jaw. In this configuration, the cam shoe 42 rests against the vertical plate 60 of the upper jaw 36 in a vertical position and the aperture 48 helps to hold the cam shoe 42 in this position. As noted above, in one embodiment, the cam shoe 42 could alternatively be integrated into the lower jaw 38 in such a manner that allows the cam shoe 42 to move toward the upper jaw 36 when the cam lever 40 is in the locked position and move away from the upper jaw 36 upon release of the cam lever 40.

In order to interconnect the brake pedal fastener 2 to the piston-type tandem braking system, in one embodiment, the brake pedal fastener 2 is further comprised of a coupling member 58 that is partially housed by the cam lever 40. See FIGS. 7, 8, and 13A–13D. In one embodiment, the coupling member 58 has an alignment aperture 82, which is substantially of the same diameter as the axial apertures 74 of the cam lever 40. However, in this embodiment, the alignment aperture 82 of the coupling member 58 is not used to rotate the coupling member 58. Rather, the alignment aperture 82 of the coupling member 58 is used to secure the coupling member 58 to the brake pedal fastener 2.

In order to interconnect the cam lever 40 an decoupling member 58 to the brake pedal fastener, in one embodiment, the handle 50 is also further comprised of a pair of alignment apertures 82. In this configuration, a pin 84 is inserted through the alignment apertures 82 of the handle 50 and coupling member 58, and the axial apertures 74 of the cam lever 40. See FIG. 7. The pin 84 also aligns and maintains the cam lever 40 in the proper position against the cam shoe 42. As one ordinarily skilled in the art can appreciate, the pin 84 can be designed to be removable to facilitate repair of the components of the brake pedal fastener 2. Other interconnection and alignment means are also intended to be within the spirit and scope of the present invention.

In order to ensure the brake pedal fastener's durability, the stationary plate 4, lower jaw 38, moveable plate 16, upper jaw 36, and coupling member 58 are preferably comprised of rigid non-brittle materials which are not likely to wear, bend, or break during continual use. Metals and metal alloys such as stainless steel, carbon steel, titanium, and/or aluminum are preferable materials, as are numerous other metals commonly known in the art. Additionally, plastics, fiberglass, and other similar materials, which have similar physical properties, may be used. In one embodiment, in order to minimize costs and increase durability, the cam shoe 42 and cam lever 40 are made out of Delron plastic. However, other resilient metal alloys, metals, and/or plastics can be used.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. An apparatus adapted to grasp a brake pedal, comprising:

(a) an upper member;

(b) a lower member in slidable communication with the upper member;

(c) a locking mechanism in communication with the upper member and having a selectable first position and a second position;

(d) a coupling member connected to the lower member; and wherein the locking mechanism further comprises a cam lever connected to a cam shoe and the cam shoe is between the cam lever and the upper member, further wherein the second position, the locking mechanism applies sufficient frictional force to lock the upper member in a selected position against the brake pedal.

2. The apparatus of claim 1, further comprising a biasing member between the upper member and the lower member.

3. The apparatus of claim 2, wherein the biasing member is at least one spring.

4. The apparatus of claim 1, wherein the lower member is further comprised of at least one flange for gripping the brake pedal.

5. The apparatus of claim 1, wherein the upper member is further comprised of at least one flange.

6. The apparatus of claim 1, wherein the upper member is further comprised of at least one flange with a beaded edge for facilitating removal of the upper member from the brake pedal.

7. The apparatus of claim 1, wherein the lower member is further comprised of at least one flange with a beaded edge to facilitate removal from the brake pedal.

8. The apparatus of claim 1, wherein the lower member includes a handle.

9. An apparatus adapted to grasp a brake pedal, comprising:
(a) an upper member;
(b) a lower member in slidable communication with the upper member;
(c) a locking mechanism in communication with the upper member and having a selectable first position and a second position;
(d) a coupling member connected to the lower member; and
wherein the locking mechanism is a cam lever;
further wherein the second position, the locking mechanism applies sufficient frictional force to lock the upper member in a selected position against the brake pedal.

10. An apparatus adapted to grasp a brake pedal, comprising:
(a) an upper member;
(b) a lower member in slidable communication with the upper member;
(c) a locking mechanism in communication with the upper member and having a selectable first position and a second position;
(d) a coupling member connected to the lower member; and
wherein the lower member is further comprised of a cam shoe that is in operable contact with the locking mechanism.
further wherein the second position, the locking mechanism applies sufficient frictional force to lock the upper member in a selected position against the brake pedal.

11. The apparatus of claim 10, wherein at least a portion of the cam shoe is connected to the lower member.

12. An apparatus adapted for grasping with a brake pedal, comprising:
(a) an upper jaw;
(b) a lower jaw in slidable communication with the upper jaw;
(c) a cam lever;
(d) a cam shoe interposed between the cam lever and the upper jaw; and
(e) a coupling interconnected to the lower jaw.

13. The apparatus of claim 12, further comprising a biasing means interposed between the upper jaw and the lower jaw.

14. The apparatus of claim 13, wherein the biasing means is at least one spring.

15. The apparatus of claim 12, wherein the cam lever has a first unlocked position and a second locked position, further wherein the second locked position, the cam lever applies sufficient frictional force to the cam shoe to selectively lock the upper jaw in a desired position relative to the lower jaw.

16. The apparatus of claim 12, wherein the lower jaw is further comprised of an aperture adapted to receive the cam shoe.

17. The apparatus of claim 12, wherein at least a portion of the cam shoe is interconnected to the lower jaw.

18. The apparatus of claim 12, wherein the lower jaw is further comprised of at least one flange for gripping the brake pedal.

19. The apparatus of claim 12, wherein the upper jaw is further comprised of at least one flange for gripping the brake pedal.

20. The apparatus of claim 12, wherein the upper jaw is further comprised of at least one flange with a beaded edge for facilitating removal of the upper jaw from the brake pedal.

21. The apparatus of claim 12, wherein the lower jaw is further comprised of at least one flange with a beaded edge for facilitating removal of the lower jaw from the brake pedal.

22. The apparatus of claim 12, wherein the lower jaw is further comprised of a handle.

23. An apparatus adapted for gripping a brake pedal, comprising:
(a) an upper gripping means;
(b) a lower gripping means in slidable communication with the upper gripping means;
(c) a cam lever for applying frictional force against the upper gripping means to selectively lock the upper and lower gripping means against the brake pedal; and
(d) coupling means interconnected to the lower gripping means.

24. The apparatus of claim 23, further comprising a biasing means interposed between the upper gripping means and the lower gripping means.

25. The apparatus of claim 24, wherein the biasing means is at least one spring.

26. The apparatus of claim 23, wherein the lower gripping means is further comprised of at least one flange for gripping the brake pedal.

27. The apparatus of claim 23, wherein the upper gripping means is further comprised of at least one flange.

28. The apparatus of claim 23, wherein the upper gripping means is further comprised of at least one flange with a beaded edge for facilitating removal of the upper gripping means from the brake pedal.

29. The apparatus of claim 23, wherein the lower gripping means is further comprised of at least one flange with a beaded edge for facilitating removal of the lower gripping means from the brake pedal.

30. An apparatus adapted for gripping a brake pedal, comprising:
(a) an upper gripping means;
(b) a lower gripping means in slidable communication with the upper gripping means;
(c) a cam lever in communication with a cam shoe for applying frictional force against the upper gripping means to selectively lock the upper and lower gripping means against the brake pedal; and
(d) a coupling means interconnected to the lower gripping means.

31. The apparatus of claim 30, wherein at least a portion of the cam shoe is interconnected to the lower gripping means.

* * * * *